No. 734,105. PATENTED JULY 21, 1903.
J. W. TALLMADGE.
ACETYLENE GAS GENERATOR.
APPLICATION FILED DEC. 3, 1902.
NO MODEL. 3 SHEETS—SHEET 2.

WITNESSES:
INVENTOR:

No. 734,105. PATENTED JULY 21, 1903.
J. W. TALLMADGE.
ACETYLENE GAS GENERATOR.
APPLICATION FILED DEC. 3, 1902.
NO MODEL. 3 SHEETS—SHEET 3.

WITNESSES:
Frank G. Parker
John Buckler

INVENTOR:
James W. Tallmadge

No. 734,105. Patented July 21, 1903.

UNITED STATES PATENT OFFICE.

JAMES W. TALLMADGE, OF BOSTON, MASSACHUSETTS.

ACETYLENE-GAS GENERATOR.

SPECIFICATION forming part of Letters Patent No. 734,105, dated July 21, 1903.

Application filed December 3, 1902. Serial No. 133,792. (No model.)

*To all whom it may concern:*

Be it known that I, JAMES W. TALLMADGE, a citizen of the United States, residing in Boston, in the county of Suffolk and State of Massachusetts, have invented new and useful Improvements in Acetylene-Gas Apparatus, of which the following is a specification.

This invention relates to apparatus for the manufacture of acetylene gas by feeding calcium carbid into water, the supply of carbid thereto being automatically controlled by the pressure of the gas generated, and the invention or improvement overcomes great objections incident to the use of such apparatus as heretofore constructed. Its construction prohibits the escape of gaseous matter into the building and also prevents tampering with its mechanical mechanism or its contents. I accomplish this object by means of the mechanism illustrated in the accompanying drawings, in which—

Figure 1:
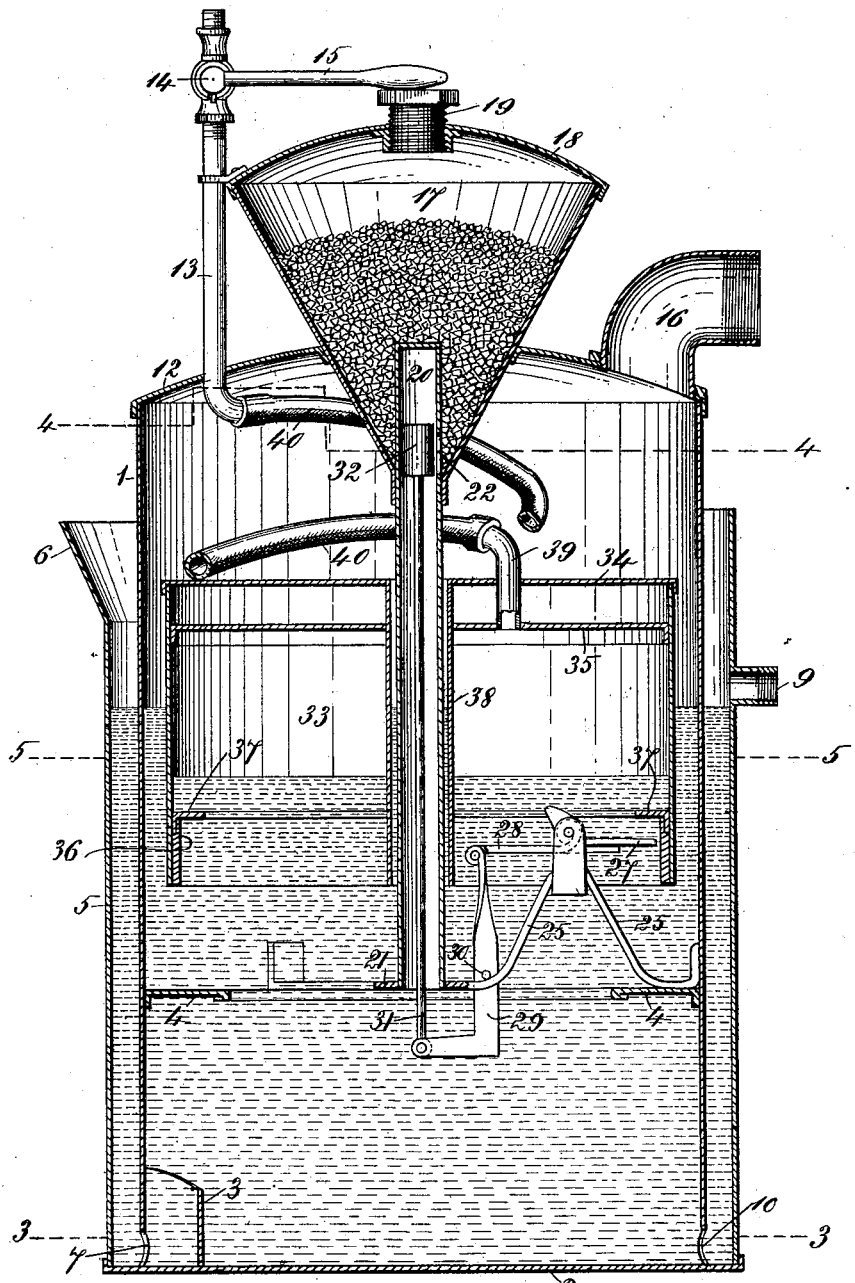
Figure 2:
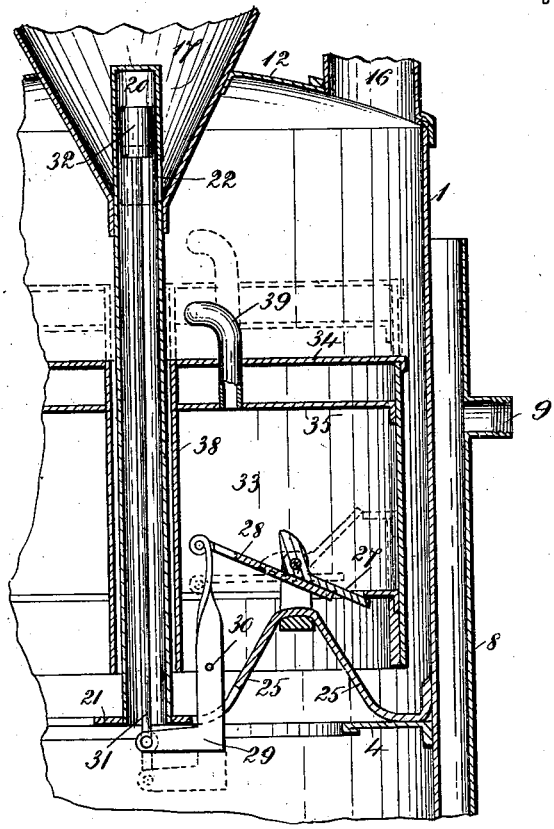
Figure 3:
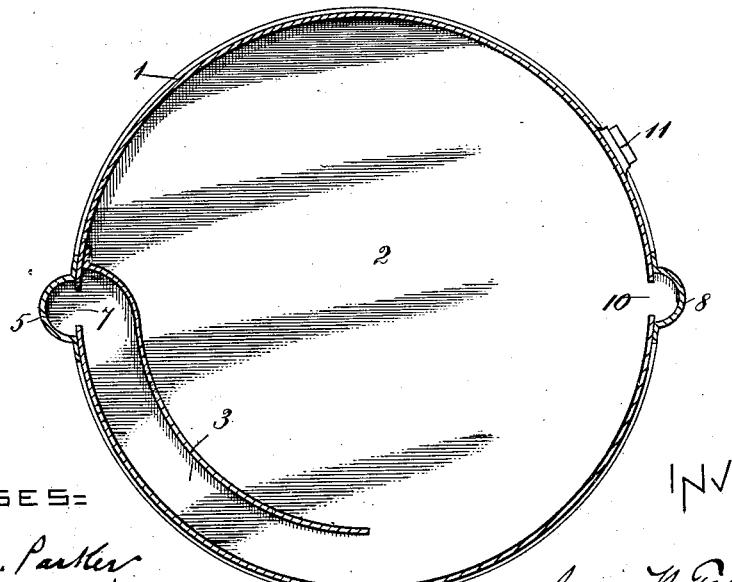
Figure 4:
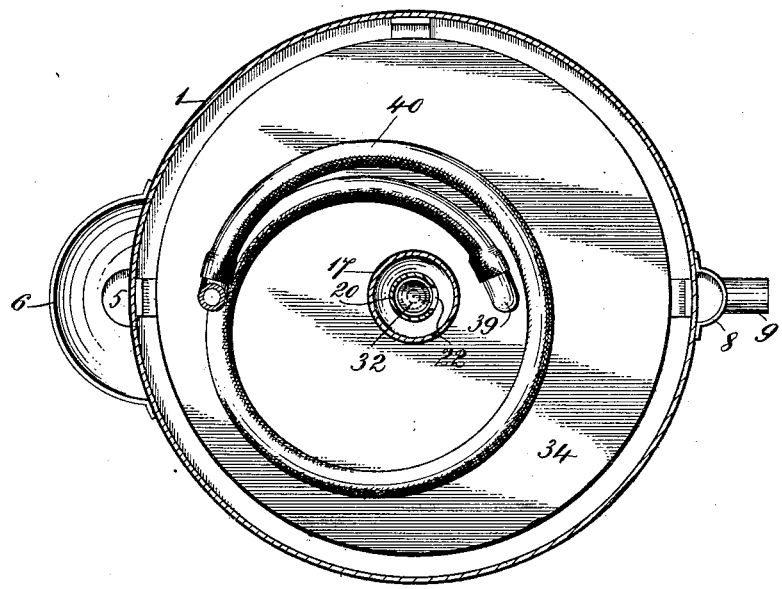
Figure 5:
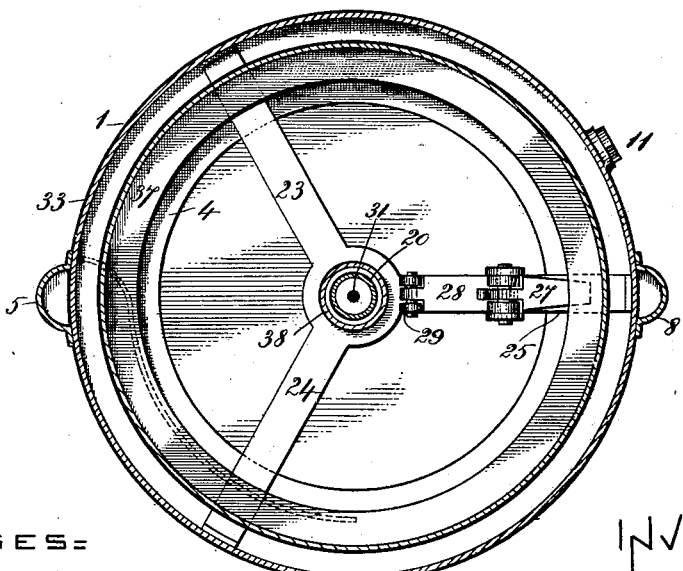

Figure 1 is a view in vertical section. Fig. 2 is a detail sectional view representing feed mechanism. Fig. 3 is a horizontal section on line 3 3 of Fig. 1. Fig. 4 is the same on line 4 4 of Fig. 1. Fig. 5 is the same on line 5 5 of Fig. 1.

Similar characters of reference indicate corresponding parts.

1 represents a tank, preferably of sheet metal and cylindrical in form and provided with a flat bottom 2, to which is affixed a curved segment 3, arranged to give a rotary movement to water as it enters said tank. A horizontal flange 4 is affixed around the inner wall of said tank a suitable distance above its bottom, arranged to deflect and prevent gas rising to the surface of the water outside of the wall of bell 33, hereinafter described. A vertical segment 5 is affixed to the outer wall of and extends from near the top of to the bottom of said tank, its upper open end being funnel-shaped, as 6, and its closed lower end inclosing hole 7 in the wall of said tank, all arranged for introducing water into said tank. A vertical segment 8 is also affixed to the outer wall of and extends from near the top of to the bottom of said tank, being open at its top (for vent) and provided near its upper end with a horizontal outlet-pipe, as 9, and its closed lower end inclosing hole 10 in the wall of said tank, all arranged to accommodate water overflow from said tank. A screw-plugged hole 11 is provided in the wall of said tank close to its bottom, for withdrawing water.

A conical-shaped top 12 is affixed to the tank 1 and provided with a vertical gas-outlet pipe 13, affixed through and extending from a short distance below to a suitable distance above said top, having a cock 14 affixed to its upper end provided with a lever 15. Said top 12 is also provided with a vent-hole 16, adapted for pipe connections to the outside atmosphere to permit air circulation.

A funnel-shaped carbid-receptacle 17, having a conical-shaped top 18 and provided at its apex with a screw-plugged hole 19, is affixed to and its small end extends through the center of the top 12 of tank 1.

A vertical carbid-feed pipe 20, closed at the top and provided with a horizontal outwardly-projecting flange 21, affixed around its open lower end to deflect and prevent gas rising to the surface of the water inside of pipe 38, hereinafter described. Said pipe 20 is also provided with an inlet-hole 22 in its side wall opening into receptacle 17 and is affixed through the nozzle of said receptacle, extending from a suitable distance within the said receptacle down through the center of the tank 1 to a plane with the deflecting-flange 4, being provided at its lower end with braces 23, 24, and 25, extending horizontally therefrom and affixed to the inner wall of the tank 1 at equidistant circumferential points. Said brace 25 is A-shaped and provided with a slot 26 through its inner leg. Also its apex serves as a fulcrum, to which is hinged a horizontal combination-lever, consisting of a dog 27, provided at its hinged end with an upturned heel to prevent it falling on its back, its projecting end extending a suitable distance toward the inner wall of the tank 1, and a bar 28, its shortest end extending a short distance beneath said dog and its longest end projecting a suitable distance toward the feed-pipe 20. To the projecting end of bar 28 is hinged the vertical end of an L-shaped bar 29, which extends down loosely through the slot 26, being provided with a pin 30 above said slot, arranged to check its descent when the bar 28 drops to a horizontal position. To the lower inwardly-projecting horizontal end of said bar 29 is hinged the lower end of a vertical rod 31, which extends up inside of the vertical feed-pipe 20 to the inlet-hole 22 in said pipe. Affixed to the upper end of said rod 31 is a gate 32, consisting of a tube adapted to move vertically in said pipe 20 and of suitable length to obstruct the hole 22 in said pipe, (when not engaged by the dog 27 and its connecting mechanism,) the functions of which are hereinafter described.

33 represents a bell, preferably of sheet metal and cylindrical in form and provided with a flat top 34, also a transverse partition 35, (for rejecting superfluous gas,) affixed a short distance below said top, also a hoop 36, (for pressure-weight,) affixed around inside its open bottom, and also a horizontal projecting flange 37, (for operating the dog 27,) affixed around inside of said bell just above said hoop. An open-ended telescopical pipe 38 is affixed vertically through the center of the top 34 and the partition 35, extending the length of said bell 33 and adapted to move vertically on the carbid-feed pipe 20 to guide the vertical movement of said bell. A vertical gas-outlet pipe 39 is affixed to the partition 35 and extends up a short distance through and is affixed to the top 34 of said bell 33, where it is connected by means of a flexible tube 40 to the lower inner end of the vertical gas-outlet pipe 13.

To instal this apparatus, it is placed in the desired position, and pipe connections are made from the cock 14 to service-pipes of the building to be illuminated. Pipe connections are also made from the vent-hole 16 to the outside atmosphere. When the tank 1 is empty, the bell 33 rests upon the braces 23, 24, and 25. Therefore the flange 37 is below the dog 27.

To prepare the generator for use, the cock 14 is closed by placing its lever 15 in a vertical position. Water is then introduced into the tank 1 through the segment 5 until it flows from the segment 8 through the pipe 9. After the surface of the water that is being introduced rises to and intercepts the bell 33 it carries said bell up, causing the flange 37 to lift, pass, and drop the projecting end of the dog 27 without moving the bar 28. After the requisite quantity of water has been introduced said flange 37 is some distance above said dog 27. By removing the plug from the hole 19 carbid may be introduced into the receptacle 17, after which said plug is replaced and said lever 15 is moved to a horizontal position (extending over the plugged hole 19) and the cock 14 is open. Burner-cocks in the building are next opened to allow the air confined in the bell 33 to pass out and permit said bell to descend until the flange 37 meets and carries down the projecting end of the dog 27 (which in conjunction with its connecting mechanism lifts the gate 32) enough to permit sufficient carbid to pass through the hole 22 and fall down the pipe 20 into the water contained in the tank 1 and generate gas, which gas rises to the surface of the water within bell 33 and elevates said bell, carrying up said flange 37 away from said dog 27 and allowing the gate 32 to descend by gravity and obstruct the hole 22, thereby stopping the feed of carbid. Air previously contained in the bell 33 having now been displaced by the descent of said bell and replaced by gas the burners may be lighted, and as fast as gas is consumed the above-described automatic movements will repeat their functions so long as the receptacle 17 contains carbid. No gas can be generated when no cocks are open. When the plug is removed from hole 19, water rises by gravity in the pipe 20 to the plane of the water in tank 1; but gas cannot escape. When the generator is in operation, said pipe 20 contains no water, and the plane of the water within the tank 1 is above that within the bell 33, the proper altitudes being determined and maintained by the weight of the hoop 36. In case of overproduction (which cannot occur when the mechanism is intact) gas passes from beneath the bell 33 and rises up through the water between the outer wall of said bell and the inner wall of the tank 1, escaping by way of the vent-hole 16 to the outside atmosphere.

In the care of the generator residuum is removed by adding water, which being rotated as it enters tank 1 (by means of segment 3) stirs up the contents of said tank, and the residuum is carried out by the water as it overflows through pipe 9. By flushing water through until its overflow runs clear the tank may be thoroughly cleansed without interrupting generating functions.

Before the plug can be removed from the hole 19 (to replenish carbid) the lever 15 must first be moved to a vertical position, which closes the cock 14 and renders the generator inoperative. If carbid is replenished before the supply contained in the receptacle 17 has been exhausted, the automatic movements hereinbefore described will not relax their functions. If carbid is not replenished to the receptacle 17 before its contents are entirely exhausted and sufficient gas has been consumed to permit the bell 33 to descend low enough to allow the flange 37 to carry down the projecting end of the dog 27 until it moves the bar 28 to an angle of about forty-five degrees, then the end of said dog will have slipped past said flange, allowing the gate 32 to descend by gravity and move (by its connecting mechanism) said bar 28 and dog 27 to a horizontal position. Said gate will then be closed and said dog will have lost its function. By removing plug from the hole 11 and withdrawing water from the tank 1 until its surface falls to a plane below the bottom of the bell 33 and then replacing said plug and water the normal positions of the dog 27 and flange 37 will be restored. Either water or carbid may be replenished first or both at the same time without hazard.

I claim—

1. An acetylene-generator comprising a closed tank, provided with means for supplying liquid thereto and flushing, a carbid-hopper supported on the upper part of the tank, a gasometer-bell adapted to rise and fall in liquid contained in said tank, a carbid-feed mechanism controlled by the movements of the bell, a feed-tube for the carbid extending from the carbid-hopper and opening into the liquid below the lower end of the bell, the said tank being provided with a vent-hole for connection with the outside atmosphere, all the operative parts inclosed within said tank, and protected thereby from being removed or tampered with, substantially as set forth.

2. An acetylene-generator comprising a closed tank provided with means for supplying liquid thereto and flushing out residue, a carbid-hopper supported on the upper part of the tank, a tube depending from the hopper and extending below the working level of the liquid in the tank, an outward-extending flange on the lower end of the tube, an inwardly-extending flange on the inner wall of the tank, an annular gasometer-bell within the tank above the flanges aforesaid and provided with a sleeve surrounding the said tube, a carbid-feeding valve controlling the flow of carbid from the hopper into the tube and controlled by the movement of the bell, substantially as set forth.

3. An acetylene-generator comprising a closed tank, a vent thereon adapted to be connected to the outer air, the said tank supporting a carbid-hopper and being provided with means for supplying water thereto and flushing out residue, a carbid-feed tube depending from said hopper extending below the working level of the liquid and provided with an outwardly-extending flange at its lower end and an inwardly-projecting flange on the wall of said tank, an annular gasometer-bell within the tank provided with a sleeve surrounding said tube, and located above said flanges, a carbid-feed valve controlling the feed of carbid into the tube, feed-valve-controlling mechanism supported on said flanges and operated by said gasometer-bell, all the operative parts inclosed by said tank and protected thereby from being removed or tampered with, substantially as set forth.

JAMES W. TALLMADGE.

Witnesses:
FRANK G. PARKER,
JOHN BUCKLER.